United States Patent [19]
Hanson

[11] Patent Number: 5,705,769
[45] Date of Patent: Jan. 6, 1998

[54] VIBRATIONALLY DAMPED STRUCTURE

[75] Inventor: Jeffrey S. Hanson, Wakefield, R.I.

[73] Assignee: The United States of America as represented by the Secretary of the Navy, Washington, D.C.

[21] Appl. No.: 645,734

[22] Filed: May 14, 1996

[51] Int. Cl.$^6$ .............. F16F 15/00; B32B 25/04; B63H 21/30
[52] U.S. Cl. .......... 114/20.1; 181/290; 181/292; 181/294; 367/149; 367/151; 367/173; 367/176
[58] Field of Search .................. 114/20.1, 20.2, 114/312, 342; 181/208, 284, 286, 290, 292, 294; 156/71; 367/1, 149, 151, 173, 176

[56] References Cited

U.S. PATENT DOCUMENTS

| | | | |
|---|---|---|---|
| 3,130,700 | 4/1964 | Peterson | 114/20.1 |
| 4,399,526 | 8/1983 | Eynck | 367/149 |
| 4,756,264 | 7/1988 | Ewbank | 114/20.1 |
| 5,106,439 | 4/1992 | Wellings et al. | 156/71 |
| 5,337,288 | 8/1994 | Sorathia et al. | 367/1 |
| 5,389,746 | 2/1995 | Moody | 181/0.5 |
| 5,396,855 | 3/1995 | DuBois | 114/20.1 |

*Primary Examiner*—Michael J. Carone
*Assistant Examiner*—Matthew J. Lattig
*Attorney, Agent, or Firm*—Michael J. McGowan; James M. Kasischke; Prithvi C. Lall

[57] ABSTRACT

A vibrationally damped structure includes a structure that is susceptible to vibrations and a constrained damping layer positioned over at least a portion of the vibrating structure. The constrained damping layer includes a continuous damping layer bonded to the surface of the structure for providing the first reduction of vibrational energy transmitted through the structure. The constrained damping layer further includes a segmented constraining layer bonded to a portion of the continuous damping layer for providing a second reduction of vibrational energy transmitted through the structure and the continuous damping layer. The continuous damping layer preferably includes a layer of elastomeric material bonded to the structure with an epoxy bonding compound or the like. The segmented constraining layer includes a plurality of rigid segments, such as aluminum plates, bonded to the continuous damping layer with a bonding compound. The constrained damping layer can be placed over the shell structure on its interior surface, exterior surface or both surfaces.

14 Claims, 3 Drawing Sheets

VIBRATIONALLY DAMPED STRUCTURE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

(1) Field of the Invention

This invention relates to vibrationally damped structures and in particular, a constrained damping layer for damping vibrational energy in a structure such as the hull of an underwater vehicle.

(2) Description of the Prior Art

In an environment subject to vibrational energy, there is a concern with the transmission of vibrational energy through a structure that houses vibration or noise generating mechanisms. This is of particular concern in an underwater environment where an underwater vehicle or other similar structure is subject to internally generated noise and turbulent boundary layer flow noise. In a typical underwater vehicle, such as a torpedo, a far field radiated noise signature is generated by propulsion systems such as motors or engines and internal components such as an inertial guidance system or tape recorder. Also, propulsors generate directly radiated hydrodynamic noise and re-radiated structural excitation. Vibrational energy generated by these internal systems is transmitted to the hull structure, for example, through mounts or shaft couplings. Without proper damping, the hull acts as an acoustic radiator. Additional vibrational energy is caused in a moving underwater vehicle by turbulent boundary layer flow noise exciting the hull structure.

Noise reduction may be achieved by isolating components from the hull or by lowering the source levels of vibrational energy generated by components through balancing. However, an inexpensive way of further minimizing hull vibration is by damping the hull or similar structure directly. Various patents disclose mechanisms for damping vibrating structures and particularly underwater vehicles, but none of the prior art discloses a damping layer according to the present invention and having the advantages of the present invention.

U.S. Pat. No. 3,130,700 to Peterson discloses a vibration and mechanical wave attenuating layer covering the exterior surface of a torpedo hull. However, the damping layer actually includes three layers: a central sheet 13 with a dense material 16, and two sandwiching sheets 14, 15. Such a structure requiring two elastomeric layers and a dense material comprised of a plurality of small pellets or other small metal particles may be expensive, difficult to install, and could unnecessarily increase the weight of the torpedo.

U.S. Pat. No. 5,396,855 to DuBois discloses a tail cone assembly for a torpedo including an elastomeric material bonded to inner and outer surfaces of a tubular sheet of the tail cone. While layers of elastomeric material on the tail cone provide some damping, DuBois does not disclose a damping structure that can be easily installed throughout an underwater vehicle. Also, the tail cone assembly requires elastomeric layers on both inner and outer surfaces.

SUMMARY OF THE INVENTION

Accordingly, what is needed is a damping mechanism that provides a simple and inexpensive way of damping a structure subject to vibrational energy, such as the hull of an underwater vehicle.

The constrained damping layer according to the present invention provides a simple and inexpensive damping mechanism that only requires a layer of damping material fixed to the hull structure and a constraining layer fixed to the damping material. A segmented constraining layer directly fixed to the damping layer avoids having to use a plurality of small metal particles or an additional layer to cover the constraining layer.

The present invention features a vibrationally damped structure comprising a structure susceptible to vibrations and a constrained damping layer covering at least a portion of the structure's surface to dampen vibrations in the structure. The structure can be the hull of an underwater vehicle. The constrained damping layer is positioned over at least a portion of either the vehicle's interior surface, the exterior surface or both surfaces.

The constrained damping layer includes at least one continuous damping layer fixed to a surface of the structure for providing a first reduction of vibrational energy transmitted through the structure. In a preferred embodiment, the continuous damping layer is made of an elastomeric material and is bonded to the surface of the structure with a first bonding compound layer, such as an epoxy.

The constrained damping layer further includes at least one segmented constraining layer fixed to and positioned over at least a portion of the continuous damping layer for providing a second reduction of vibrational energy transmitted through the structure and the continuous damping layer. In a preferred embodiment, the segmented constraining layer includes a plurality of rigid segments, such as aluminum segments, fixed to the continuous damping layer and having a predetermined spacing between each of the segments. A second bonding compound layer, such as epoxy, bonds the rigid segments to the continuous damping layer. Each segment preferably has a size in the range of approximately 20 to 30 square inches.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
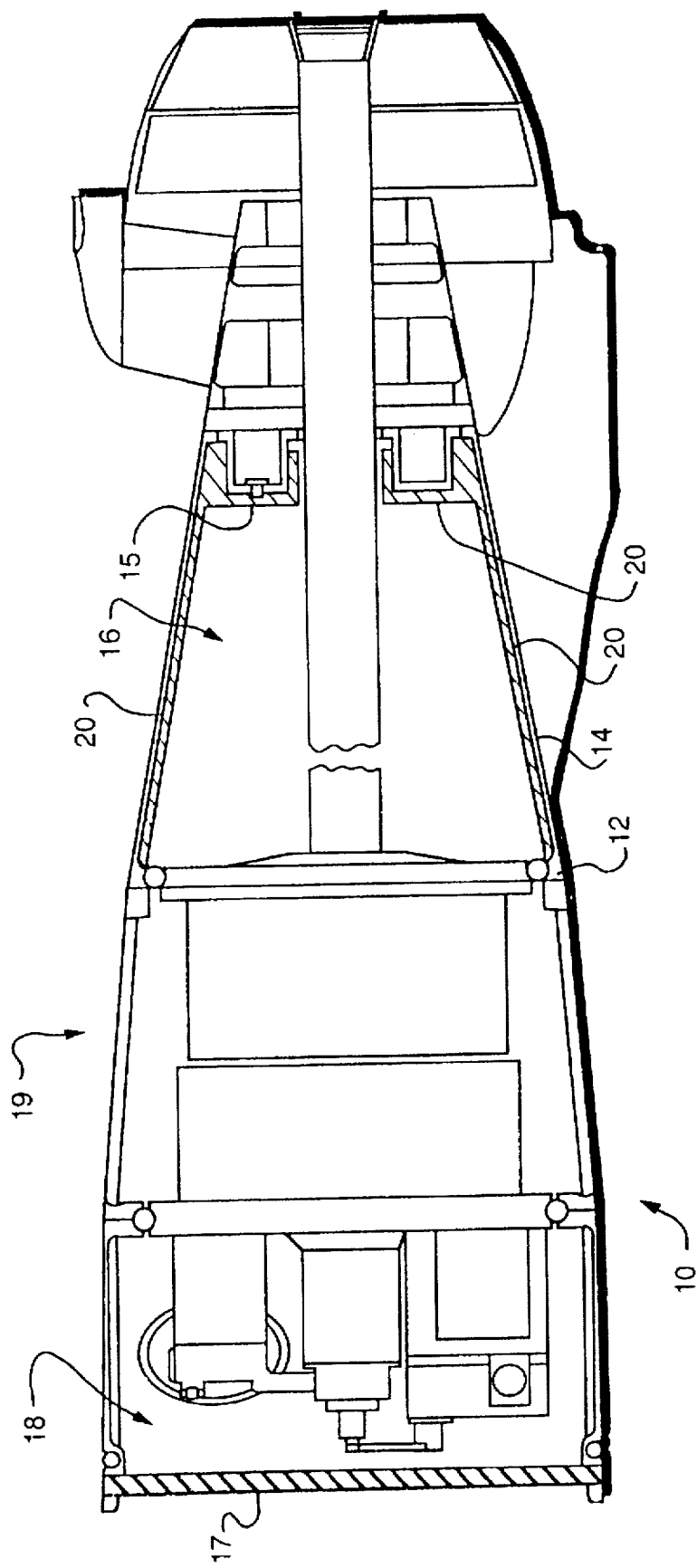
FIG. 1 is a side-sectional view of an underwater vehicle having the constrained damping layer according to the present invention over a portion of the surface of the hull structure.

The vibrationally damped structure 10, FIG. 1, according to the present invention generally includes a structure 12 that is susceptible to vibrations and a constrained damping layer 20 fixed to at least a portion of the structure 12. Typically, the constrained damping layer 20 is used to dampen the hull of a torpedo or other similar underwater vehicle, but the present invention contemplates using the constrained damping layer with any structure susceptible to vibrations and particularly structures that enclose vibrating mechanisms. Depending on the type of structure and the location of the vibrations, the constrained damping layer 20 can be placed over any portion of an interior surface 14 or exterior surface 19 of a vehicle.

In a torpedo or similar underwater vehicle, the constrained damping layer 20 is preferably placed along the free areas of the entire inside surface 14. The constrained damping layer 20 may also be placed around the hull's periphery in the fore and aft sections 16, 18. For example, the constrained damping layer 20 can cover the bulkhead 15 and the end plate 17 of the torpedo. The present invention also contemplates using the constrained damping layer 20 on the exterior surface 19 of a structure 12.

Figure 2:
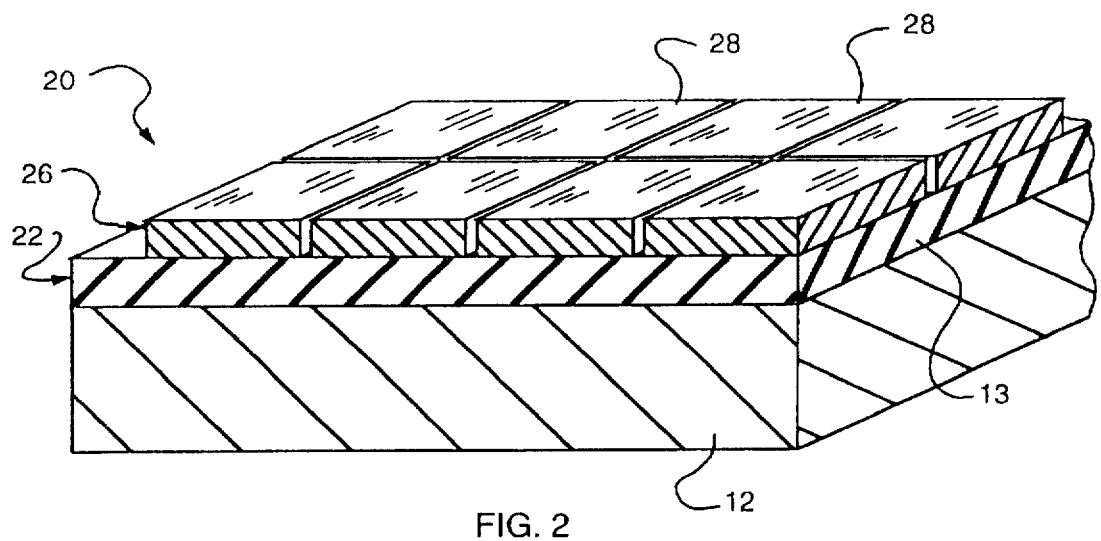
FIG. 2 is a perspective illustration of a section of the structure having the damping layer and constrained layer according to the present invention.

The constrained damping layer 20, FIG. 2, according to the present invention generally includes at least one continuous damping layer 22 and at least one segmented constraining layer 26. The continuous damping layer 22 is fixed to and positioned substantially in contact with at least a portion of the surface 13 of the structure 12. The segmented constraining layer 26 is fixed to and positioned over at least a portion of the continuous damping layer 22.

The continuous damping layer 22 is preferably made of an elastomeric damping material, such as C-1002-12 EAR elastomeric damping material. However, the present invention contemplates any elastomeric material suitable to withstand high temperature environments and to sufficiently reduce vibrations. This material should have a damping ratio as close to one as possible for a broad frequency range. The thickness of the continuous damping layer 22 must generally be sufficient to reduce structural vibrations in the vibrating structure 12. In one example, a layer approximately 0.125 inches thick of elastomeric damping material is sufficient.

The segmented constraining layer 26 includes a plurality of rigid segments 28 fixed to the continuous damping layer 22 having a predetermined spacing between each of the rigid segments 28 sufficient to dampen vibrations without each segment 28 contacting an adjacent segment. Each rigid segment 28 preferably has a size in the range of 20–30 square inches. Typically, the spacing is approximately 1/16 inches apart and the thickness of the segments is approximately 0.063 inches. The rigid segments 28 are preferably made of a material sufficient to enhance the damping properties of the elastomeric damping material layer 22, for example, aluminum or any similar material. Although the rigid segments 28 are shown as blocks, the present invention contemplates various shapes of the segments.

Figure 3:
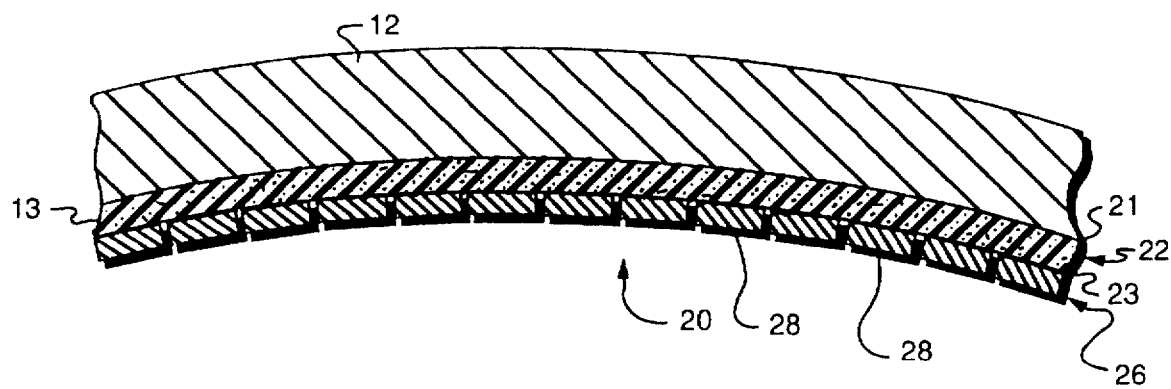
FIG. 3 is a cross-sectional view of the hull having the constrained damping layer according to the present invention.

Preferably, the continuous damping layer 22 is bonded to a surface 13 of the structure 12 with a first bonding compound layer 21, FIG. 3, such as a two part Loctite Depends 325 epoxy. The rigid segments 28 of the segmented constraining layer 26 are also preferably bonded to the continuous damping layer 22 with a second bonding compound layer 23, such as the two part Loctite Depends 325 epoxy. Other similar bonding compounds such as acrylic adhesives can be used provided that they effectuate a homogenous bond between the layers and can withstand high temperature environments. Further, a bonding compound or epoxy that is least toxic is preferred.

The bonding is accomplished by first sandblasting the surface 13 of the structure 12 and then applying the epoxy liquid part to the surface 13, e.g., with a trowel, so as to minimize the thickness of the layer of the epoxy liquid. The second epoxy part, an aerosol spray, is then lightly applied to the layer of damping material 22. After the two part bonding compound has been applied to the structure surface 13 and the damping material 22, the user has up to an hour before placing the damping material onto the structure surface 13. However, once the damping material layer 22 is placed onto the structure surface 13, the two part epoxy bounding compound typically allows bonding to be completed quickly, for example, in less than one minute.

The rigid segments 28 of the segmented constraining layer 26 are bonded in a manner similar to that described above. The rigid segments 28 are sandblasted, the epoxy liquid part is applied to the damping material 22 and the epoxy aerosol spray part is applied to the segments 28.

Figure 4A:
FIG. 4A is a diagram of the vibrational energy waves traveling through the hull structure alone.

The damping properties of the constrained damping layer will be discussed in greater detail with reference to FIGS. 4A, 4B and 4C. In the absence of a damping layer, a vibrational energy wave 42, FIG. 4A, travels through the structure 12, such as the metal hull of an underwater vehicle. Without damping, the wave 42 travels freely and the metal structure acts as an acoustic radiator.

Figure 4B:
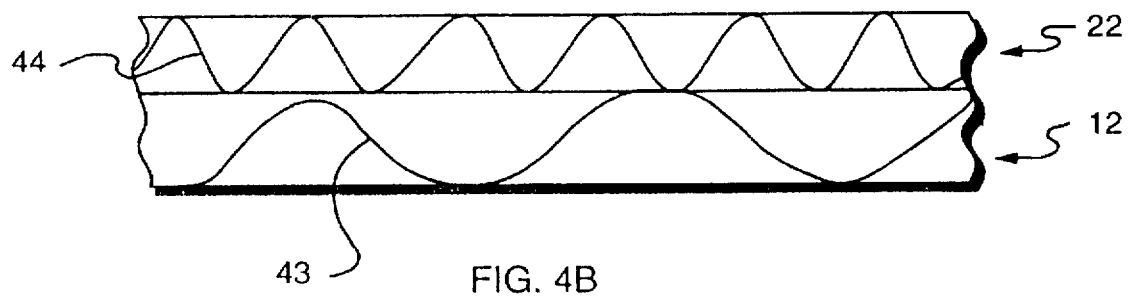
FIG. 4B is a diagram of the sheared wave traveling through the hull structure and a damping layer.

If a layer of damping material layer 22 is attached to a surface of the structure 12, FIG. 4B, the damping material causes the vibrational energy wave to be sheared as it travels through the structure 12. The sheared waves 43, 44 travel through the damping material layer 22 and structure 12 at the speed of sound of the respective materials. Since the speed of sound is different in the metal structure 12 than in the elastomeric damping material layer 22, the sheared vibrational energy waves 43, 44 propagate at different speeds through the structure 12 and the damping material 22 so as to destructively interact and dissipate the vibrational energy. Thus, the vibrational energy that would travel through a structure without damping material is now partially consumed by the addition of a layer of damping material 22.

Figure 4C:
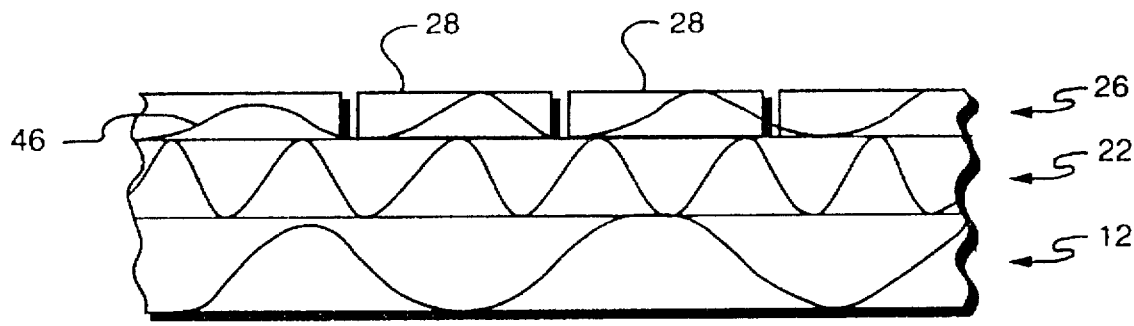
FIG. 4C is a diagram of a sheared wave of vibrational energy traveling through a hull structure, a damping layer and a constraining layer.

The addition of a segmented constraining layer 26, FIG. 4C, will further dissipate the vibrational energy transmitted from the structure 12 because the constraining layer 26 causes further shearing of the vibrational energy wave. By placing individual segments 28 on the damping material layer 22, the vibrational energy wave is further split into three sheared waves, 43, 44, 46 as the wave propagates between each individual segment 28. The segmented constraining layer 26 further reduces the movement of the damping material 22, thereby reducing the propagation of the vibrational energy wave through the damping material layer 22.

Accordingly, the constrained damping layer according to the present invention provides significant damping in a vibrating structure. The constrained damping layer effectively reduces the vibrations in the structure and the noise radiated by the vibrating structure. Such a constrained damping layer is ideally suited for use in an underwater vehicle such as a torpedo where the constrained damping layer can provide effective damping without significantly adding to the weight of the vehicle. Also, the constrained damping layer can easily be installed throughout any portion of the vehicle structure without damaging or otherwise affecting the integrity of the vehicle structure.

In light of the above, it is therefore understood that within the scope of the appended claims, the invention may be practiced otherwise than as specifically described.

What is claimed is:

1. A vibrationally damped structure comprising:
   a structure susceptible to vibrations having at least one surface;
   at least one continuous damping layer, fixed to and substantially in contact with at least a portion of said structure at least one surface for providing a first reduction of vibrational energy transmitted through said structure; and
   at least one segmented constraining layer fixed to and substantially in contact with at least a portion of said at least one continuous damping layer for providing a second reduction of vibrational energy transmitted through said structure and said at least one continuous damping layer.

2. The vibrationally damped structure of claim 1, wherein said structure includes a hull of an underwater vehicle.

3. The vibrationally damped structure of claim 1, wherein said structure includes an underwater vehicle hull having an interior surface and an exterior surface.

4. The vibrationally damped structure of claim 3, wherein said at least one continuous damping layer and said at least one segmented constraining layer substantially cover said interior surface of said underwater vehicle hull.

5. The vibrationally damped structure of claim 3, wherein said at least one continuous damping layer and said at least one segmented constraining layer substantially cover said exterior surface of said underwater hull.

6. The vibrationally damped structure of claim 1, wherein said at least one continuous damping layer includes a layer of elastomeric damping material.

7. The vibrationally damped structure of claim 1, further including a first bonding compound layer bonding said at least one continuous damping layer to said structure at least one surface.

8. The vibrationally damped structure of claim 7, further including a second bonding compound layer bonding said segmented constraining layer to said continuous damping layer.

9. The vibrationally damped structure of claim 1, wherein said at least one segmented constraining layer includes a plurality of rigid segments fixed to said at least one continuous damping layer and having a predetermined spacing between each of said plurality of rigid segments.

10. The vibrationally damped structure of claim 9, wherein said plurality of rigid segments include a plurality of aluminum plates.

11. A constrained damping layer comprising:
    at least one continuous, damping layer adapted to be bonded to a vibrating surface;
    a plurality of rigid segments bonded to said at least one continuous, damping layer with a predetermined distance between each of said plurality of rigid segments for reducing vibrational energy transmitted through the vibrating structure to said at least one continuous, damping layer; and
    a bonding compound bonding said at least one continuous damping layer to the vibrating surface and bonding said plurality of rigid segments to said at least one continuous damping layer.

12. The constrained damping layer of claim 11, wherein said plurality of rigid segments include a plurality of aluminum plates.

13. The constrained damping layer of claim 11, wherein each of said plurality of rigid segments has a surface area in the range of twenty to thirty square inches.

14. The constrained damping layer of claim 11, wherein said at least one continuous, damping layer is an elastomeric material.

* * * * *